United States Patent
Jung

(10) Patent No.: US 10,604,110 B2
(45) Date of Patent: Mar. 31, 2020

(54) ELECTRIC POWER-ASSISTED STEERING APPARATUS AND METHOD OF ASSEMBLING THE SAME

(71) Applicant: MANDO CORPORATION, Gyeonggi-do (KR)

(72) Inventor: Dae Hee Jung, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 127 days.

(21) Appl. No.: 15/985,659

(22) Filed: May 21, 2018

(65) Prior Publication Data

US 2018/0334135 A1 Nov. 22, 2018

(30) Foreign Application Priority Data

May 22, 2017 (KR) .................. 10-2017-0062778

(51) Int. Cl.
| | | |
|---|---|---|
| B62D 5/04 | (2006.01) | |
| B60R 25/0215 | (2013.01) | |
| B62D 3/08 | (2006.01) | |
| F16H 7/24 | (2006.01) | |

(52) U.S. Cl.
CPC .......... *B60R 25/02153* (2013.01); *B62D 3/08* (2013.01); *B62D 5/0424* (2013.01); *B62D 5/0448* (2013.01); *F16H 7/24* (2013.01)

(58) Field of Classification Search
CPC ...... B62D 3/08; B62D 5/0424; B62D 5/0448; B60R 25/02153
USPC .................................................. 180/444, 429
See application file for complete search history.

(56) References Cited

U.S. PATENT DOCUMENTS

| | | | | |
|---|---|---|---|---|
| 2006/0183583 | A1* | 8/2006 | Sakaida | B62D 5/0424 474/70 |
| 2012/0018242 | A1* | 1/2012 | Yamamoto | B62D 5/0424 180/444 |
| 2014/0260727 | A1* | 9/2014 | Webber | B62D 5/0424 74/89.23 |
| 2015/0284020 | A1* | 10/2015 | Asakura | F16H 25/2204 180/444 |
| 2015/0336604 | A1* | 11/2015 | Urababa | B62D 5/0424 180/444 |

(Continued)

FOREIGN PATENT DOCUMENTS

| | | |
|---|---|---|
| KR | 10-2009-0116183 | 11/2009 |
| KR | 10-2012-0131357 | 12/2012 |

OTHER PUBLICATIONS

Office Action dated Sep. 7, 2018 for Korean Patent Application No. 10-2017-0062778 and its English machine translation by Google Translate.

*Primary Examiner* — Tony H Winner
(74) *Attorney, Agent, or Firm* — Ladas & Parry, LLP

(57) ABSTRACT

Provided is an electric power-assisted steering (EPAS) apparatus including a gear housing in which a nut coupler coupled with a ball nut through a bearing is formed and an accommodation portion is formed in an internal circumferential surface of the nut coupler, and a lock screw configured to have an external circumferential surface on which a screw portion is formed, coupled to the nut coupler, and supports the bearing, and to have a loosening preventer formed to protrude toward the accommodation portion after the screw portion is coupled to the nut coupler.

20 Claims, 12 Drawing Sheets

(56) References Cited

U.S. PATENT DOCUMENTS

2017/0349205 A1* 12/2017 Kaneko .................... F16H 7/02
2018/0334135 A1* 11/2018 Jung ................ B60R 25/02153

* cited by examiner

ELECTRIC POWER-ASSISTED STEERING APPARATUS AND METHOD OF ASSEMBLING THE SAME

CROSS REFERENCE TO RELATED APPLICATION

This application claims priority from Korean Patent Application No. 10-2017-0062778, filed on May 22, 2017, which is hereby incorporated by reference for all purposes as if fully set forth herein.

BACKGROUND OF THE INVENTION

1. Field of the invention

The present disclosure relates to an electric power-assisted steering (EPAS) apparatus and a method of assembling the same. More particularly, the present disclosure relates to an EPAS apparatus for enhancing driving safety by preventing a steering wheel from being locked in the middle of driving even if a lock screw is loosened by vibations transferred to a nut pulley and a ball nut while a belt is operated by a motor or by impact transferred through a rack bar from a road surface, and a method of assembling the same.

2. Description of the Prior Art

In general, an existing EPAS apparatus includes a ball nut connected to a motor with a belt, a motor pulley, a nut pulley, a rack bar slided by rotation of the ball nut, etc. as components which transfer a driving force of the motor to the rack bar and generate steering assist power to assist a driver's steering force.

However, in this existing EPAS apparatus, when the ball nut slides the rack bar while rotating, noise and vibration occur through the rack bar, the ball nut, the nut pulley, bearings, a rack housing, etc., and the noises and vibrations are transferred to other parts and loosen fastened parts.

Also, when the belt is operated by the motor, a lock screw is loosened in some cases by strong vibations transferred to the nut pulley and the ball nut or by strong impact transferred through the rack bar from a road surface. Accordingly, a steering wheel becomes locked in the middle of driving, or the vibration and noise are transferred to the driver and degrade his or her sense of steering.

SUMMARY OF THE INVENTION

In this background, the present disclosure is to provide an electric power-assisted steering (EPAS) apparatus for enhancing driving safety by preventing a steering wheel from being locked in the middle of driving even if a lock screw is loosened by vibations transferred to a nut pulley and a ball nut while a belt is operated by a motor or by impact transferred through a rack bar from a road surface, and a method of assembling the same.

Also, the present disclosure is to provide an EPAS apparatus whose cost is reduced because it is possible to prevent loosening of a lock screw without any additional parts and which can be reworked because surrounding parts and a screw portion of the lock screw are not deformed, and a method of assembling the same.

Objects of the present disclosure are not limited thereto, and other objects which have not been mentioned will be apparent to those of ordinary skill in the art from the following descriptions.

To solve the foregoing problem, an embodiment provides an EPAS apparatus including: a gear housing in which a nut coupler coupled with a ball nut through a bearing is formed and an accommodation portion is formed in an internal circumferential surface of the nut coupler; and a lock screw configured to have an external circumferential surface on which a screw portion is formed and coupled to the nut coupler and supports the bearing, and to have a loosening preventer formed to protrude toward the accommodation portion after the screw portion is coupled to the nut coupler.

An embodiment provides a method of assembling an EPAS apparatus, the method including: fixing a bearing, which supports rotation of a ball nut in a gear housing, in a shaft direction by fastening a lock screw to the gear housing; and fixing the lock screw in the gear housing to protrude from an accommodation portion of the gear housing while gradually inserting, into an insertion groove, a caulking tool formed to have an end whose thickness is smaller than a thickness of the insertion groove, which is formed to be recessed from an upper surface of the lock screw and have a thickness gradually increasing going upward.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
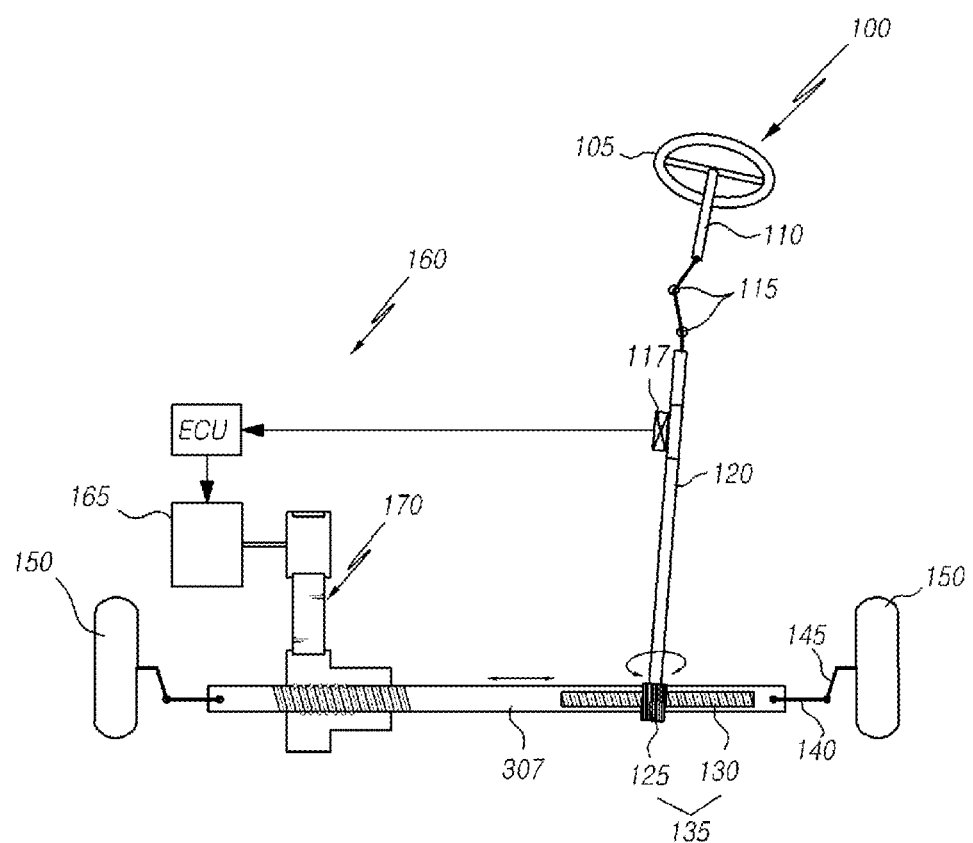
FIG. 1 is a diagram schematically showing an electric power-assisted steering (EPAS) apparatus according to an embodiment of the present disclosure.

Hereinafter, embodiments of the present disclosure will be described in detail with reference to the accompanying drawings. In adding reference numerals to elements in each drawing, the same elements will be designated by the same reference numerals if possible, although they may be shown in different drawings. Further, in the following description of the present disclosure, a detailed description of known functions and configurations incorporated herein will be omitted when it is determined that the description may make the subject matter of the present disclosure rather unclear.

In describing elements of embodiments of the present disclosure, terms such as "first," "second," "A," "B," "(a)," and "(b)" may be used. Such terms are used only to distinguish an element from another element, but do not limit the substance, sequence, order, or the like of elements. It should be noted that when one component is described as being "connected," "coupled," or "joined" to another component, still another component may be "connected," "coupled," or "joined" between the two components, even though the component may be directly "connected," "coupled," or "joined" to the other component.

Figure 2:
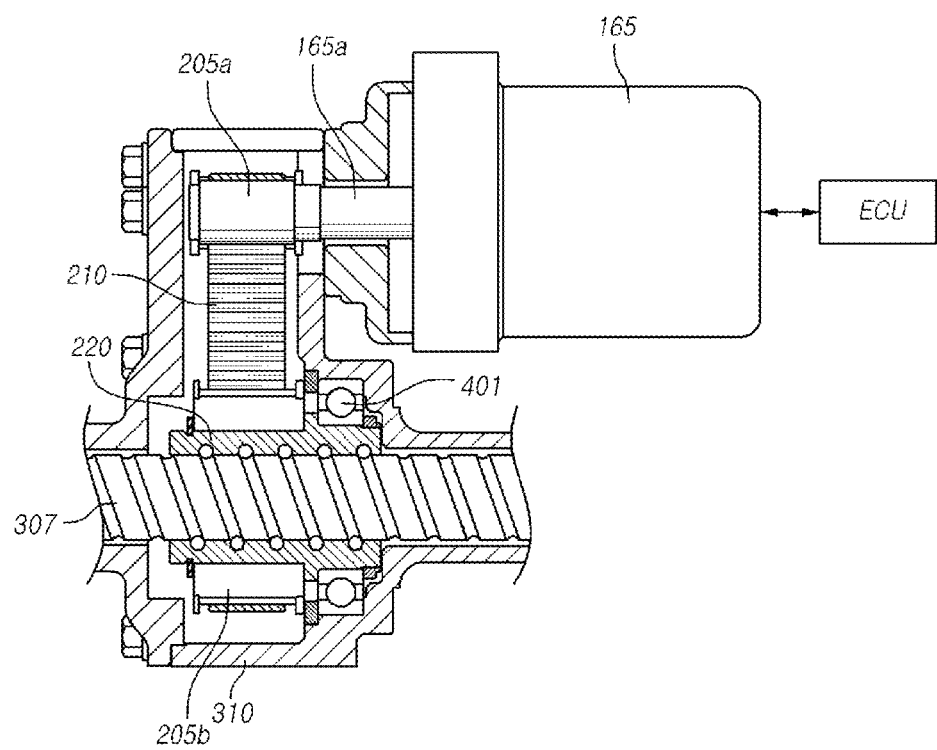
FIG. 2 is a partial cross-sectional view schematically showing a part of the EPAS apparatus according to the embodiment of the present disclosure.
Figure 3:
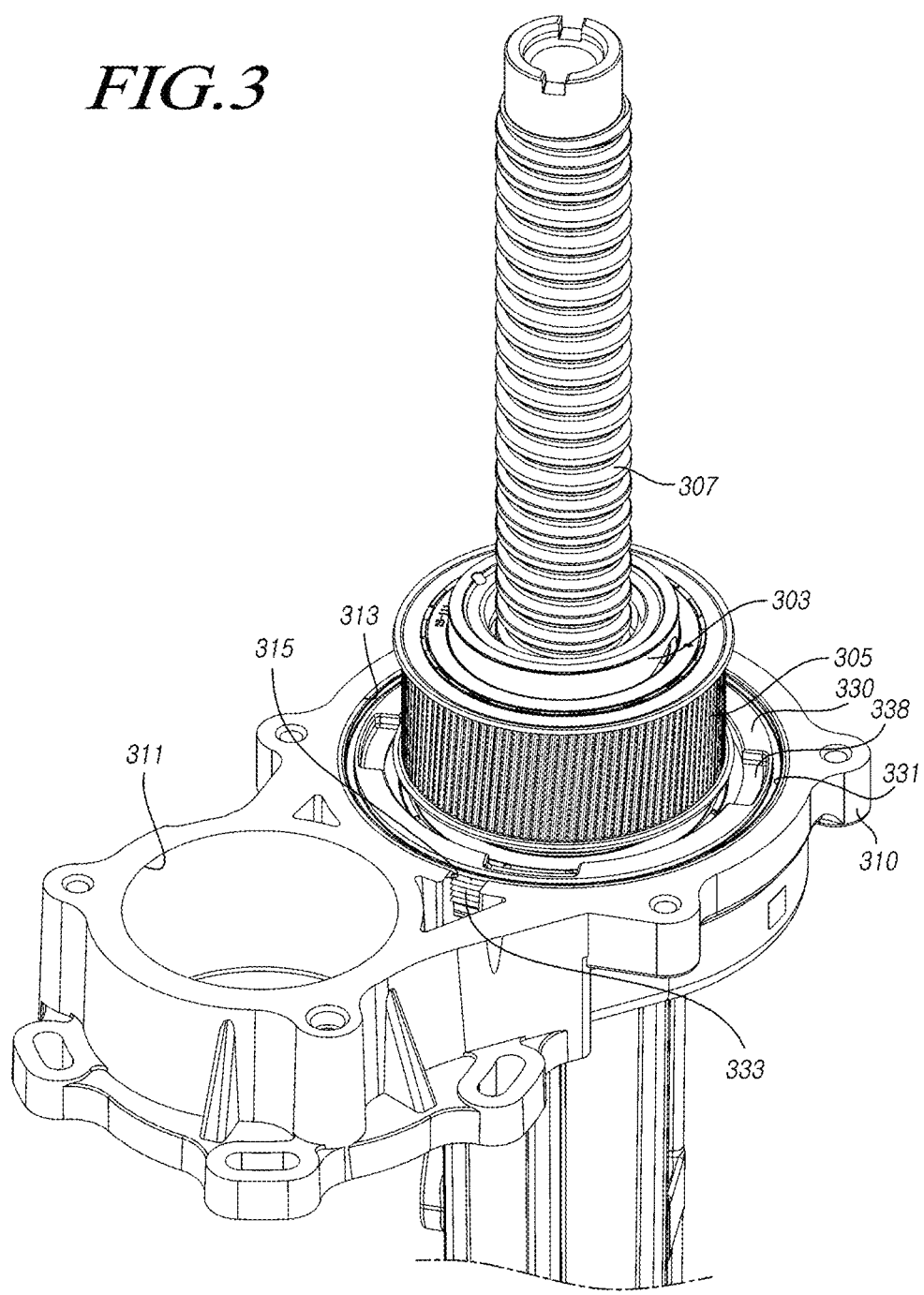
FIG. 3 is a perspective view showing a part of the EPAS apparatus according to the embodiment of the present disclosure.
Figure 4:
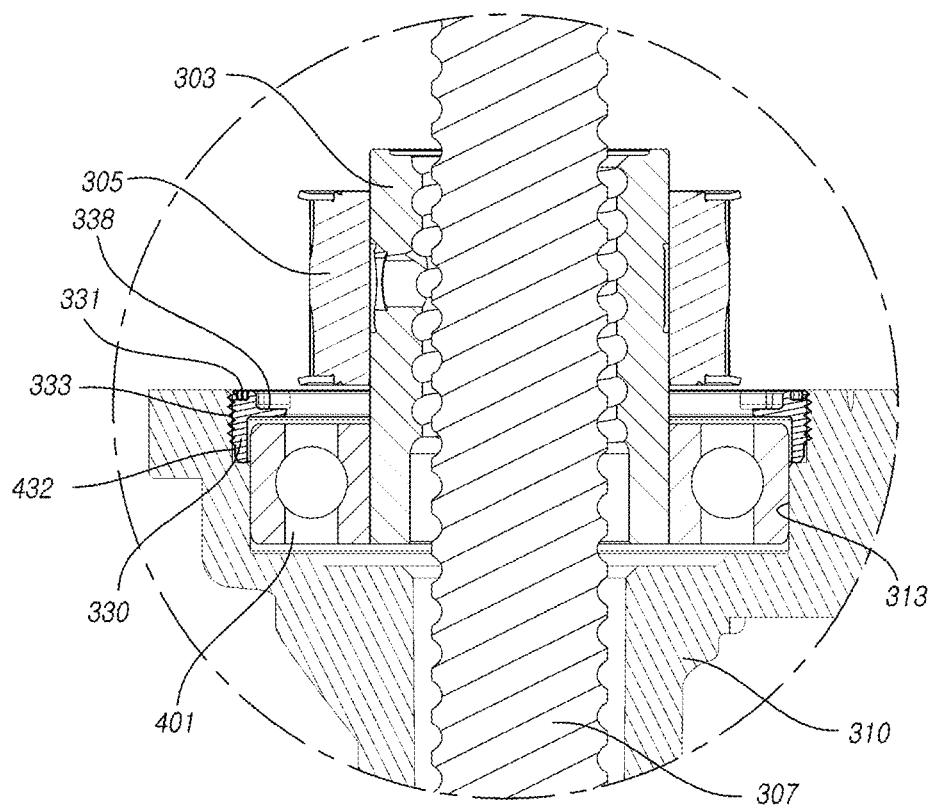
FIG. 4 is a cross-sectional view of FIG. 3.
Figure 5:
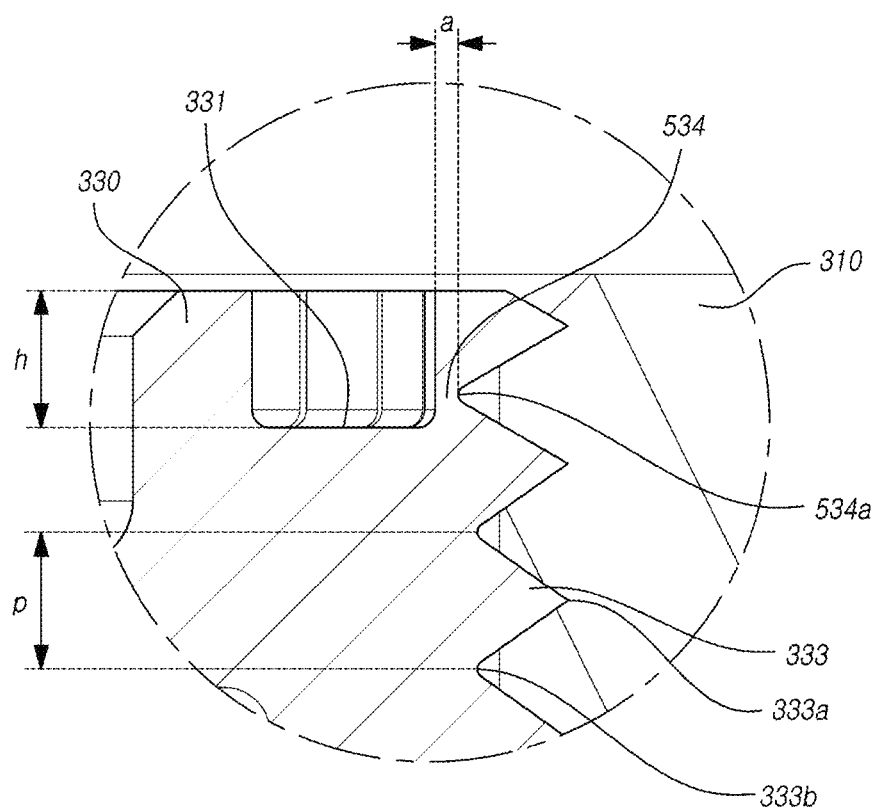
FIG. 5 is an enlarged view of FIG. 4.
Figure 6:
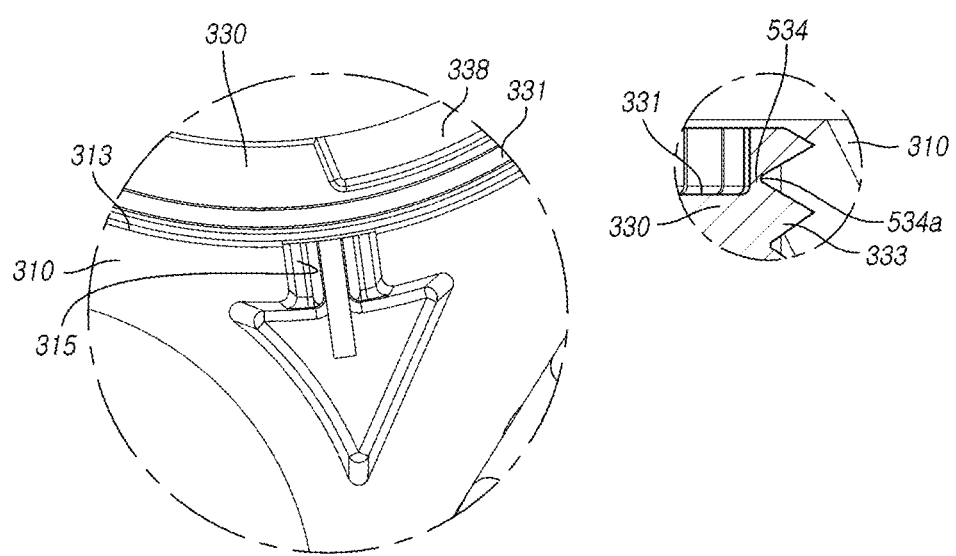
FIGS. 6 and 7 are plan views showing a lock screw of the EPAS apparatus according to the embodiment of the present disclosure before and after transformation.
Figure 7:
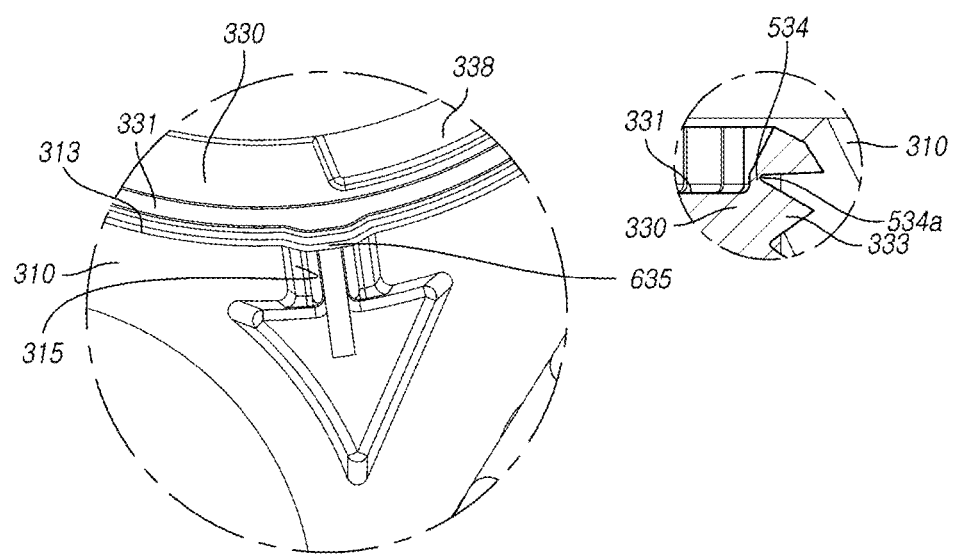
Figure 8:
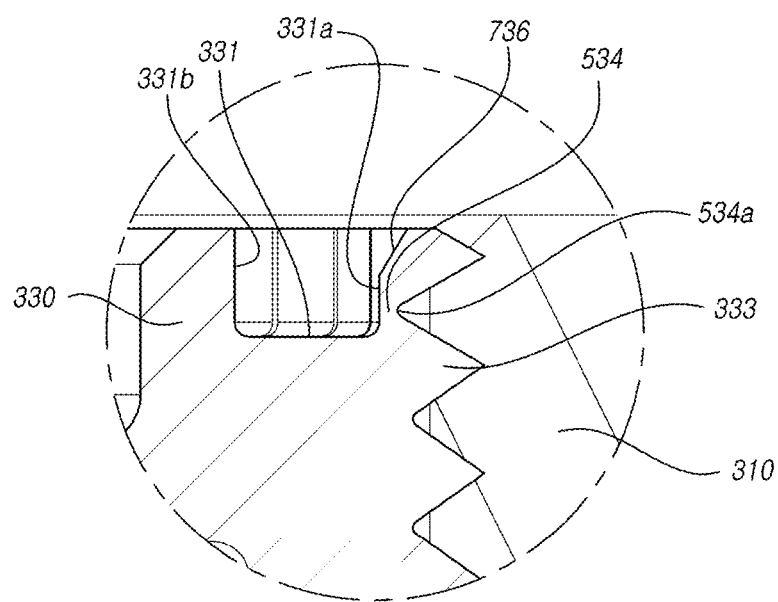
FIGS. 8 and 9 are enlarged cross-sectional views showing an EPAS apparatus according to another embodiment of the present disclosure.
Figure 9:
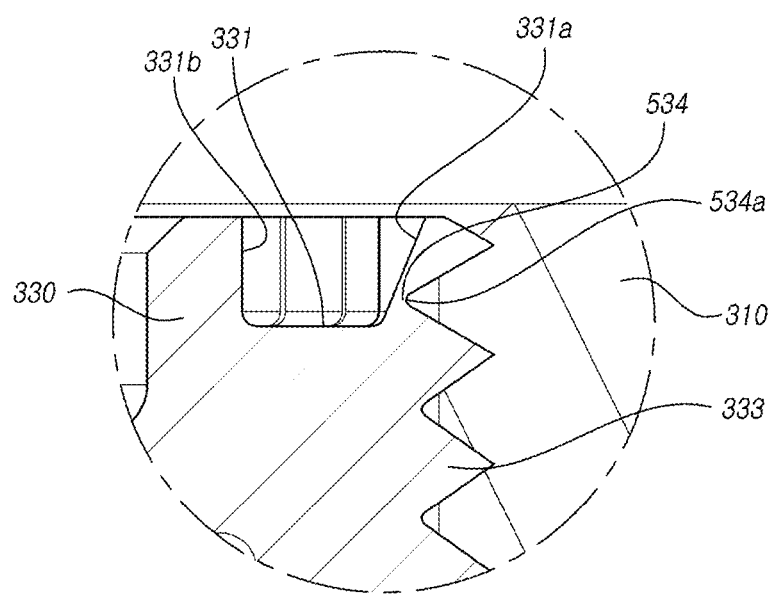
Figure 10:
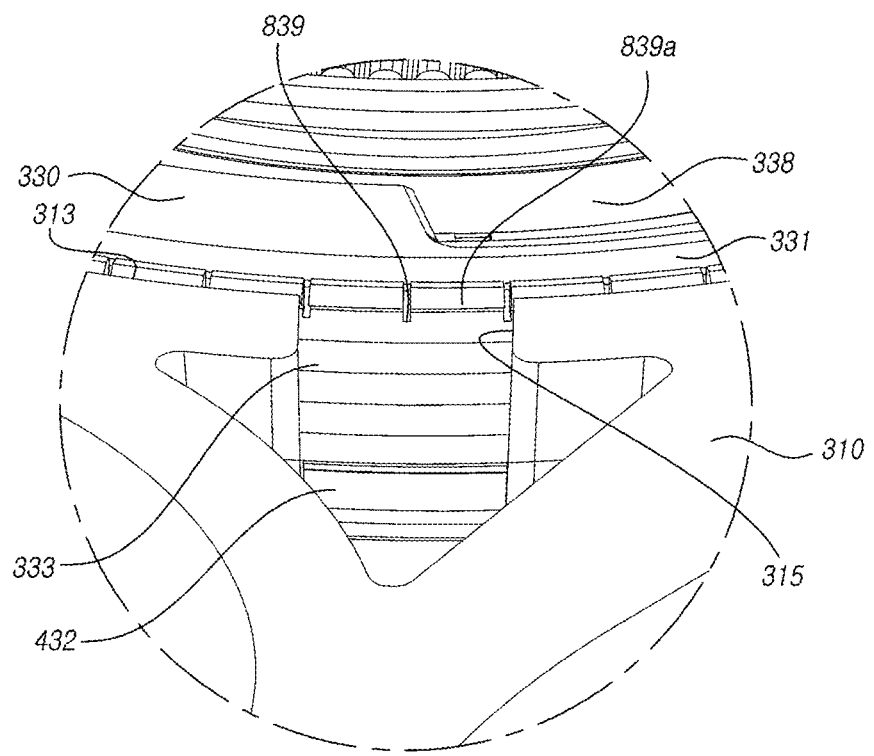
FIG. 10 is an enlarged perspective view of an EPAS apparatus according to another embodiment of the present disclosure.
Figure 11:
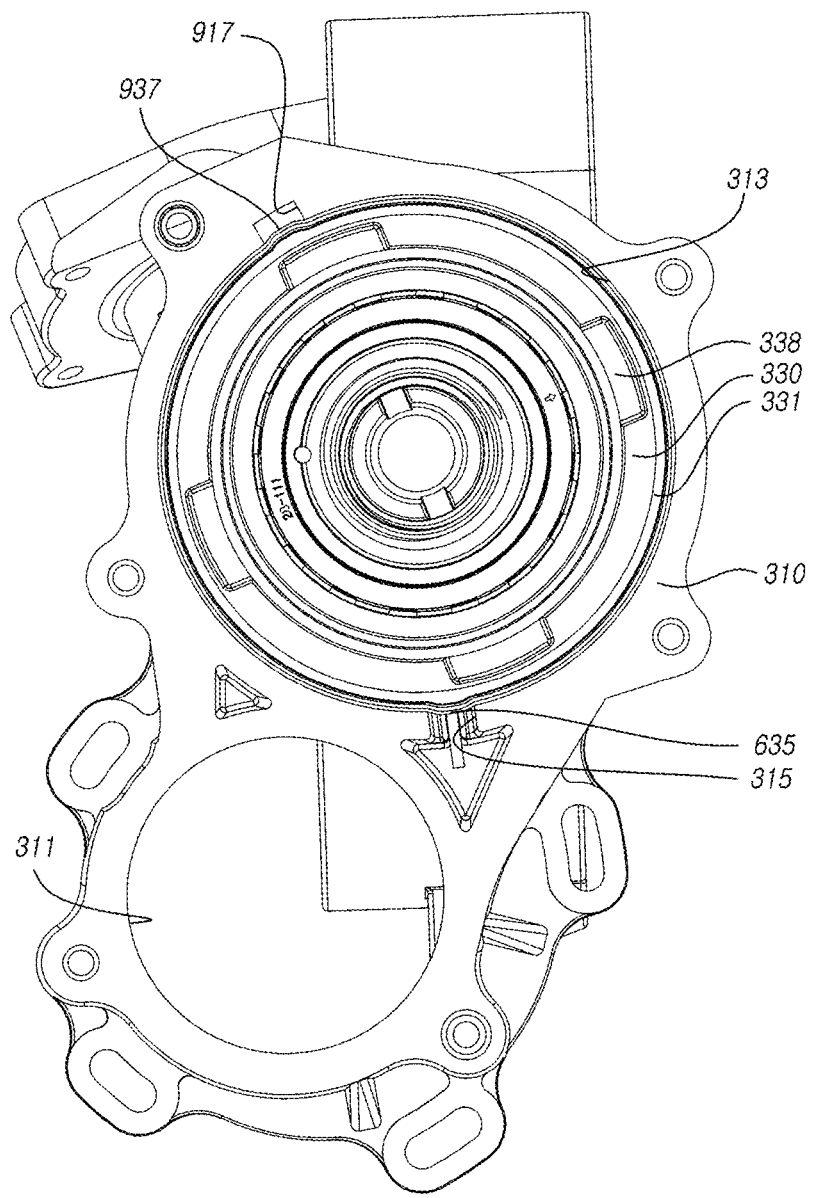
FIG. 11 is a plan view of an EPAS apparatus according to another embodiment of the present disclosure.
Figure 12:
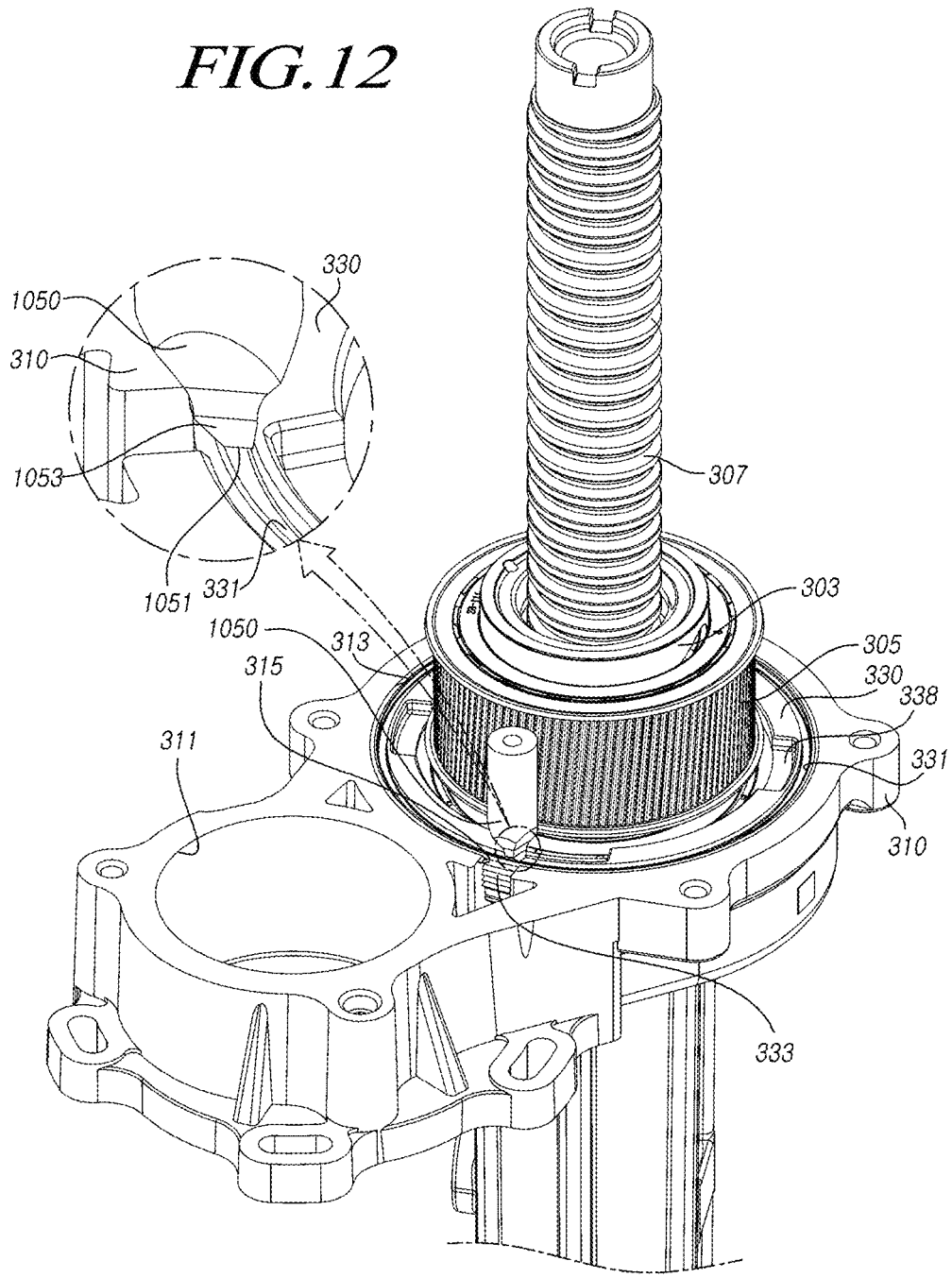
FIG. 12 is a view illustrating a method of transforming a lock screw of an EPAS apparatus according to an embodiment of the present disclosure.

FIG. 1 is a diagram schematically showing an electric power-assisted steering (EPAS) apparatus according to an embodiment of the present disclosure, FIG. 2 is a partial cross-sectional view schematically showing a part of the EPAS apparatus according to the embodiment of the present disclosure, FIG. 3 is a perspective view showing a part of the EPAS apparatus according to the embodiment of the present disclosure, FIG. 4 is a cross-sectional view of FIG. 3, FIG. 5 is an enlarged view of FIG. 4, FIGS. 6 and 7 are plan views showing a lock screw of the EPAS apparatus according to the embodiment of the present disclosure before and after transformation, FIGS. 8 and 9 are enlarged cross-sectional views showing an EPAS apparatus according to another embodiment of the present disclosure, FIG. 10 is an enlarged perspective view of an EPAS apparatus according to another embodiment of the present disclosure, FIG. 11 is a plan view of an EPAS apparatus according to another embodiment of the present disclosure, and FIG. 12 is a view illustrating a method of transforming a lock screw of an EPAS apparatus according to an embodiment of the present disclosure.

As shown in the drawings, an EPAS apparatus according to an embodiment of the present disclosure includes a gear housing 310 in which a nut coupler 313 coupled with a ball nut 303 through a bearing 401 is formed and an accommodation portion 315 is formed in an internal circumferential surface of the nut coupler 313, and a lock screw 330 configured to have an external circumferential surface on which a screw portion 333 is formed, coupled to the nut coupler 313, and supports the bearing 401, and to have a loosening preventer 635 formed to protrude toward the accommodation portion 315 after the lock screw 330 is coupled to the nut coupler 313.

First, referring to FIGS. 1 and 2, the EPAS apparatus according to an embodiment of the present disclosure includes a steering system 100 extending from a steering wheel 105 to both side wheels 150, and an auxiliary power unit 160 supplying a steering assist force to the steering system 100.

The steering system 100 includes a steering shaft 110 whose upper end is connected to the steering wheel 105 and rotates together with the steering wheel 105 and whose lower end is connected to a pinion shaft 120 through one pair of universal joints 115. The pinion shaft 120 is connected to a rack bar 307 through a rack-pinion assembly 135, and both ends of the rack bar 307 are connected to the wheels 150 of a car through tie rods 140 and knuckle arms 145.

A pinion gear 125 formed at the lower end of the pinion shaft 120 and a rack gear 130 formed on one side of the external circumferential surface of the rack bar 307 are fastened to each other, thereby forming the rack-pinion assembly 135.

The auxiliary power unit 160 includes a torque sensor 117 which senses a steering torque applied to the steering wheel 105 by a driver and outputs an electric signal proportionate to the sensed steering torque, an electronic control unit (ECU) which generates a control signal on the basis of the electric signal transferred from the torque sensor 117, a motor 165 which generates a steering assist force on the basis of the control signal transferred from the ECU, and a belt-type transmission device 170 which transfers the assistance power generated by the motor 165 to the rack bar 307 through a belt 210.

The belt-type transmission device 170 includes the motor 165 controlled by the ECU, a motor pulley 205a fixed at a shaft 165a of the motor 165, the belt 210 wound around the motor pulley 205a, a ball nut 220 supporting the rack bar 307 and provided in the gear housing 310 surrounding the rack bar 307, and a nut pulley 205b coupled to an external circumferential surface of the ball nut 220, and the like.

The ball nut 220 is coupled to the rack bar 307 through balls and slides the rack bar 307 in a rack housing 200a while rotating. The bearing 401 which supports rotation of the ball nut 220 is installed on the external circumferential surface of the ball nut 220.

Such an EPAS apparatus according to an embodiment of the present disclosure includes a driving means and a means of being driven, and the driving means includes a motor (see 165 of FIG. 2) controlled by an ECU, a motor pulley (see 205a of FIG. 2) coupled to a shaft (see 165a of FIG. 2) of the motor, a belt (see 210 of FIG. 2), and the like.

Also, the means of being driven includes the ball nut 303 supporting the rack bar 307 in the rack housing 200a, a nut pulley 305 coupled to an external circumferential surface of the ball nut 303, and the like.

The motor pulley 205a connected to the motor 165 and the nut pulley 305 connected to the rack bar 307 are disposed in parallel to each other. The belt 210 is wound around the motor pulley 205 and the nut pulley 305. Therefore, a turning force of the motor 165 is transferred to the rack bar 307 through the ball nut 303, and the rack bar 307 is moved to the left or right by operation of the ball nut 303 so that a steering assist force is generated.

The ball nut 303 is coupled to the rack bar 307 through balls and slides the rack bar 307 in the rack housing 200a and the gear housing 310 while rotating, and the nut pulley 305 which rotates the ball nut 303 is installed on the external circumferential surface of the ball nut 303. Accordingly, it is possible to generate a steering assist force by moving the rack bar 307 to the left or right.

Also, the ball nut 303 is coupled to the gear housing 310 through the bearing 401 so that the ball nut 303 rotates in the gear housing 310, and a motor coupler 311 to which the motor 165 is coupled and the nut coupler 313 to which the ball nut 303 is coupled are formed in the gear housing 310, such that the rack housing 200a is coupled to the gear housing 310 through a fastening member (not shown).

Further, the lock screw 330, which is fastened to the nut coupler 313 and supports the rim of the bearing 401 in a shaft direction, is provided in the gear housing 310 and fixed to support the bearing 401.

Here, when the lock screw 330, which is fixed to the gear housing 310 and supports the rim of the bearing 401, is loosened due to vibrations caused by operation of the rack bar 307 or an impact force reversely input from a road surface, the bearing 401 and the ball nut 303 are moved to the left or right along with the rack bar 307.

When the ball nut 303 is moved due to loosening of the lock screw 330 and thus the nut pulley 305 makes contact with the gear housing 310 or the rack housing 200a, the nut pulley 305 resists rotation, and the steering wheel 105 may become locked in some severe cases.

Therefore, the present disclosure provides the accommodation portion 315 formed to be recessed from the internal circumferential surface of the nut coupler 313 in the gear housing 310, and a part of the lock screw 330 protrudes toward the accommodation portion 315 after the lock screw 330 is coupled to the gear housing 310, such that loosening of the lock screw 330 is prevented.

Here, one or more accommodation portions 315 may be disposed in a circumferential direction on the internal circumferential surface of the nut coupler 313, and may be disposed in a region between the motor coupler 311 and the nut coupler 313.

The lock screw 330 has the external circumferential surface on which the screw portion 333 is formed and thus is threadedly engaged with the nut coupler 313. An assembly portion 432 is formed in the screw portion 333 so as to be easily inserted into the nut coupler 313 having a reduced external diameter on a lower side of the external circumferential surface, and a tool groove 338 is formed on an upper surface of the lock screw 330, such that the lock screw 330 may be easily coupled to the nut coupler 313 with a tool.

Also, the loosening preventer 635 which is threadedly engaged with the nut coupler 313 and then protrudes toward the accommodation portion 315 is formed in the lock screw 330. Therefore, even when vibrations caused by operation of the rack bar 307 or an impact force reversely input from a road surface is transferred to the lock screw 330, the loosening preventer 635 is caught by the accommodation portion 315, and thus it is possible to prevent the lock screw 330 from being loosened from the nut coupler 313.

A part of the lock screw 330 may be made to protrude toward the accommodation portion 315 with a tool which will be described below. An insertion groove 331 which is formed to be recessed from the upper surface of the lock screw 330 in a groove shape is provided in the lock screw 330, and thus it is easy to insert the tool into the insertion groove 331 and make a part of the lock screw 330 protrude.

The insertion groove 331 is formed at a position in the upper surface of the lock screw 330 adjacent to the external circumferential surface between the tool groove 338 and the screw portion 333 of the lock screw 330. In other words, a thickness between the insertion groove 331 and the external circumferential surface is formed to be smaller than a thickness between the insertion groove 331 and the internal circumferential surface.

Accordingly, when the tool is inserted into the insertion groove 331, the lock screw 330 is transformed outward, and the transformed loosening preventer 635 protrudes toward the accommodation portion 315, such that loosening of the lock screw 330 is prevented.

A depth h to which the insertion groove 331 is formed is larger than a shaft-direction distance p between adjacent ridges 333a of the screw portion 333.

Valleys 33b of the screw portion 333 are required to be positioned in the external circumferential surface of the lock screw 330 in which the insertion groove 331 is formed so that valleys 333b may be transformed and protrude toward the accommodation portion 315. The screw portion 333 is formed on the external circumferential surface of the lock screw 330, and valleys 333b of the screw portion 333 are not formed at a uniform height of the lock screw 330.

Accordingly, the depth to which the insertion groove 331 is formed should be larger than the distance between adjacent ridges 333a of the screw portion 333, that is, a distance by which the screw advances in the shaft direction when the screw is turned one revolution.

A transformation portion 534 which is transformed when protruding toward the accommodation portion 315 of the lock screw 330 is formed between the insertion groove 331 and a valley 33b of the screw portion 333.

In other words, the depth h to which the insertion groove 331 is formed is larger than the shaft-direction distance p between adjacent ridges 333a of the screw portion 333 so that the transformation portion 534 is formed in the lock screw 330 in which the insertion groove 331 is formed.

Here, a transformation-inducing groove 534a is formed in the screw portion 333 to facilitate transformation of the transformation portion 534.

The transformation-inducing groove 534a is formed to be recessed further than valleys 333b in the screw portion 333 of the lock screw 330. In other words, since the transformation-inducing groove 534a is formed in the screw portion 333, a thickness a of the transformation portion 534 is formed to be small, and the transformation-inducing groove 534a makes it possible to easily transform the transformation portion 534 by using the tool.

The thickness a of the transformation portion 534 may be formed to be 0.1 mm to 1.0 mm by way of example.

If the thickness a of the transformation portion 534 is formed to be smaller than 0.1 mm, the transformation portion 534 may be cut off when the lock screw 330 is transformed with the tool or restored for rework. If the thickness a of the transformation portion 534 is formed to be larger than 0.1 mm, transformation may not be performed normally due to the large thickness when the lock screw 330 is transformed with the tool.

Accordingly, the transformation-inducing groove 534a which is recessed further than valleys 333b is formed in the screw portion 333 of the lock screw 330 so that transformation of the transformation portion 534 is facilitated.

The loosening preventer 635 of the lock screw 330 will be described with reference to FIGS. 6 and 7. FIG. 6 shows a state in which the lock screw 330 is fastened to the nut coupler 313 of the gear housing 310 before the lock screw 330 is transformed, and FIG. 7 shows a state in which the loosening preventer 635 protrudes toward the accommodation portion 315 after a part of the lock screw 330 is transformed to protrude.

The loosening preventer 635 may be formed by making a part of the lock screw 330 protrude by using a caulking tool which will be described below.

The loosening preventer 635 protrudes toward the accommodation portion 315, and both ends of the loosening preventer 635 collide with both walls of the accommodation portion 315, thereby preventing the lock screw 330 from rotating in the nut coupler 313.

As described above, since loosening of the lock screw 330 is prevented by making an upper portion of the lock screw 330 protrude toward the accommodation portion 315, it is possible to prevent loosening of the lock screw 330 without any additional parts, and the lock screw 330 can be reworked by restoring the protruding loosening preventer 635 when reworking of the lock screw 330 is necessary.

In particular, unlike fixing the lock screw 330 by transforming a threadedly engaged portion between the nut coupler 313 and the screw portion 333 of the lock screw 330, making a part of the lock screw 330 protrude toward the accommodation portion 315 by inserting the tool into the insertion groove 331 allows reworking of the lock screw 330 and prevents deformation of surrounding parts, thereby allowing reuse of the lock screw 330.

As shown in FIGS. 8 and 9, a support portion 736 may be formed in the insertion groove 331, or an outer circumferential wall 331a may be diagonally formed, so that the tool may be inserted into the insertion groove 331 easily.

Referring to FIG. 8, between the outer circumferential wall 331a and an inner circumferential wall 331b of the insertion groove 331 facing each other, the support portion 736 is formed to taper in the outer circumferential wall 331a so that the width of the insertion groove 331 increases going upward.

In other words, the support portion 736 increases a width of the upper portion of the insertion groove 331 so that the tool is inserted into the insertion groove 331 easily.

Referring to FIG. 9, between the outer circumferential wall 331a and an inner circumferential wall 331b of the insertion groove 331 facing each other, the outer circumferential wall 331a is diagonally formed so that the width of the insertion groove 331 gradually increases going upward.

The outer circumferential wall 331a of the insertion groove 331 increases a width of the upper portion so that the tool is inserted easily. Also, the tool may be inserted into the insertion groove 331 and may gradually make a part of the lock screw 330 protrude toward the accommodation portion 315 such that the transformation portion 534 is prevented from being cut off due to sudden transformation.

Referring to FIG. 10, a plurality of dividing slits 839 are formed at the upper end of the lock screw 330 between the screw portion 333 and the insertion groove 331 of the lock screw 330 such that it is easy to make the lock screw 330 protrude toward the accommodation portion 315 by inserting the tool into the insertion groove 331.

When the lock screw 330 is about to be loosened, both ends of the protruding loosening preventer 635 are supported and caught by both walls of the accommodation portion 315 facing each other, and thus a supporting force for preventing loosening of the lock screw 330 is increased.

The plurality of dividing slits 839 are formed at regular intervals in a circumferential direction of the lock screw 330, and the circumferential intervals between the plurality of dividing slits 839 are formed to be smaller than half a circumferential width of the accommodation portion 315 so that any one of lock screw portions 839a divided by the dividing slits 839 is positioned in the accommodation portion 315.

In other words, the circumferential intervals between the dividing slits 839 are formed to be smaller than half the circumferential width of the accommodation portion 315 so that any one of the lock screw portions 839a divided by the dividing slits 839 is positioned in the accommodation portion 315 even when the lock screw 330 is threadedly engaged with the nut coupler 313.

Also, referring to FIG. 11, an auxiliary groove 917 which is formed to be recessed at a position away from the accommodation portion 315 in the internal circumferential surface of the nut coupler 313 is provided, and a hanger portion 937 is formed to protrude from the lock screw 330 toward the auxiliary groove 917, so that the lock screw 330 is stably prevented from being loosened from the nut coupler 313 in a rotation direction.

The auxiliary groove 917 is formed to be recessed more than the insertion groove 331 and formed at a position away from the accommodation portion 315 in the internal circumferential surface of the nut coupler 313.

In this way, the auxiliary groove 917 is prevented from being formed to communicate with the accommodation portion 315, so that the screw portion 333 of the lock screw 330 may be stably and threadedly engaged with the nut coupler 313, and also the hanger portion 937 protruding toward the auxiliary groove 917 is caught by the auxiliary groove 917 and prevents loosening of the lock screw 330.

The hanger portion 937 may also be made to protrude toward the auxiliary groove 917 by using the tool after the lock screw 330 is threadedly engaged with the nut coupler 313.

A method of assembling such an EPAS apparatus will be described with additional reference to FIG. 12. The method includes an operation of fixing the bearing 401, which supports rotation of the ball nut 303 in the gear housing 310, in a shaft direction by fastening the lock screw 330 to the nut coupler 313 of the gear housing 310, and an operation of forming the insertion groove 331 in the upper surface of the lock screw 330, and fixing the lock screw 330 in the gear housing 310 by plastic deformation, that is, inserting a caulking tool 1050 into the insertion groove 331 and making a part of the upper surface of the lock screw 330 protrude outward.

First, the ball nut 303 is coupled to the nut coupler 313 of the gear housing 310 through the bearing 401, and the lock screw 330 is fastened to the nut coupler 313 to fix the rim of the bearing 401 in the shaft direction.

Then, a part of the lock screw 330 is made to protrude toward the accommodation portion 315 by inserting the caulking tool 1050 into the insertion groove 331 of the lock screw 330 fastened to the nut coupler 313, so that loosening of the lock screw 330 is prevented.

Here, a thickness of an end 1051 of the caulking tool 1050 is formed to be smaller than a width of an upper end of the insertion groove 331, and the caulking tool 1050 is formed to have a pressurizing portion 1053 whose thickness gradually increases going upward from the end 1051, so that the caulking tool 1050 may be inserted into the insertion groove 331 easily.

Accordingly, the end 1051 of the caulking tool 1050 is inserted into the insertion groove 331 easily, and the pressurizing portion 1053 increases the width of the insertion groove 331 while the caulking tool 1050 is gradually inserted into the insertion groove 331, such that a part of the upper surfce of the lock screw 330 protrudes outward.

Also, the accommodation portion 315 is formed to be recessed in the internal circumferential surface of the nut coupler 313, and a part of the upper surface of the lock screw 330 is made to protrude toward the accommodation portion 315 by inserting the caulking tool 1050 into the insertion groove 331 adjacent to the accommodation portion 315.

A thickness between the external circumferential surface of the lock screw 330 and the insertion groove 331 is formed to be smaller than a thickness between the internal circumferential surface of the lock screw 330 and the insertion groove 331, and a part of the upper surface of the lock screw 330 is made to protrude toward the accommodation portion by gradually inserting the caulking tool 1050 into the insertion groove 331.

Accordingly, the protruding loosening preventer 635 are supported by both walls of the accommodation portion 315 facing each other such that loosening of the lock screw 330 is prevented.

According to the embodiments of the present disclosure having such a form and structure, it is possible to prevent a steering wheel from becoming locked in the middle of driving even if a lock screw is loosened by vibrations transferred to a nut pulley and a ball nut while a belt is operated by a motor or by impact transferred through a rack bar from a road surface, such that driving safety is enhanced.

Also, the cost is reduced because it is possible to prevent loosening of a lock screw without any additional parts, and rework is possible because surrounding parts and a screw portion of the lock screw are not deformed.

According to the embodiments of the present disclosure, driving safety is improved by preventing a steering wheel from becoming locked in the middle of driving even if a lock screw is loosened by vibations transferred to a nut pulley and a ball nut while a belt is operated by a motor or by impact transferred through a rack bar from a road surface.

Also, cost is reduced because it is possible to prevent loosening of a lock screw without any additional parts, and rework is possible because surrounding parts and a screw portion of the lock screw are not deformed.

Even if all the components of the embodiments of the present disclosure have been described as being combined into a single unit or combined to be operated as a single unit, the present disclosure is not necessarily limited to the embodiments. In other words, at least two of all the structural components may be selectively combined and operated without departing from the objective scope of the present disclosure.

The above embodiments of the present disclosure have been described only for illustrative purposes, and those skilled in the art will appreciate that various modifications and changes may be made thereto without departing from the scope and spirit of the disclosure. Therefore, the embodiments of the present disclosure are not intended to limit, but are intended to illustrate the technical idea of the present disclosure, and the scope of the technical idea of the present disclosure is not limited by the embodiments. The scope of the present disclosure shall be construed on the basis of the accompanying claims in such a manner that all of the technical ideas included within the scope equivalent to the claims belong to the present disclosure.

What is claimed is:

1. An electric power-assisted steering (EPAS) apparatus comprising:
   a gear housing in which a nut coupler coupled to a ball nut through a bearing is formed and an accommodation portion is formed to be recessed from an internal circumferential surface of the nut coupler; and
   a lock screw configured to have an external circumferential surface on which a screw portion is formed and coupled to the nut coupler and supports the bearing, and to have a loosening preventer formed to protrude toward the accommodation portion after the screw portion is coupled to the nut coupler.

2. The EPAS apparatus of claim 1, wherein one or more accommodation portions are disposed in a circumferential direction on the internal circumferential surface of the nut coupler.

3. The EPAS apparatus of claim 1, wherein the accommodation portion is disposed between a motor coupler and the nut coupler of the gear housing.

4. The EPAS apparatus of claim 1, wherein an assembly portion formed to have a reduced external diameter in the screw portion is provided in a lower portion of the external circumferential surface of the lock screw.

5. The EPAS apparatus of claim 1, wherein an insertion groove is formed to be recessed from an upper surface of the lock screw in a groove shape.

6. The EPAS apparatus of claim 5, wherein a depth to which the insertion groove is recessed is formed to be larger than a distance between adjacent ridges of the screw portion.

7. The EPAS apparatus of claim 5, wherein a thickness between the external circumferential surface of the lock screw and the insertion groove is formed to be smaller than a thickness between an internal circumferential surface of the lock screw and the insertion groove.

8. The EPAS apparatus of claim 5, wherein a transformation portion, which is transformed when the lock screw protrudes toward the accommodation portion, is formed between the insertion groove and a valley of the screw portion.

9. The EPAS apparatus of claim 8, wherein a transformation-inducing groove configured to facilitate transformation of the transformation portion is formed in the screw portion.

10. The EPAS apparatus of claim 9, wherein the transformation-inducing groove is formed to be recessed and have a smaller diameter than a valley of the screw portion.

11. The EPAS apparatus of claim 5, wherein, between an outer circumferential wall and an inner circumferential wall of the insertion groove facing each other, a support portion is formed to taper in the outer circumferential wall so that a width of the insertion groove increases going upward in the support portion.

12. The EPAS apparatus of claim 5, wherein, between an outer circumferential wall and an inner circumferential wall of the insertion groove facing each other, the outer circumferential wall is diagonally formed so that a width of the insertion groove increases going upward.

13. The EPAS apparatus of claim 5, wherein a plurality of dividing slits are formed at an upper end of the lock screw between the screw portion and the insertion groove of the lock screw.

14. The EPAS apparatus of claim 13, wherein the plurality of dividing slits are formed to be spaced apart at identical intervals in a circumferential direction of the lock screw, and
   the circumferential intervals between the plurality of dividing slits are formed to be smaller than half a circumferential width of the accommodation portion.

15. The EPAS apparatus of claim 13, wherein at least one of portions of the lock screw divided in a circumferential direction by adjacent dividing slits is disposed in the accommodation portion.

16. The EPAS apparatus of claim 1, wherein an auxiliary groove is formed to be recessed at a position away from the accommodation portion in the internal circumferential surface of the nut coupler, and a hanger portion is formed to protrude from the lock screw toward the auxiliary groove, so that loosening of the lock screw is prevented.

17. A method of assembling an electric power-assisted steering (EPAS) apparatus, the method comprising:
   fixing a bearing, which supports rotation of a ball nut in a gear housing, in a shaft direction by fastening a lock screw to a nut coupler of the gear housing; and
   forming an insertion groove in an upper surface of the lock screw, and fixing the lock screw in the gear housing by plastic deformation in which a caulking tool is inserted into the insertion groove to make the upper surface of the lock screw protrude outward.

18. The method of claim 17, wherein the caulking tool is formed to have an end whose thickness is smaller than a width of the insertion groove and have a thickness gradually increasing going upward from the end such that the upper surface of the lock screw is subjected to plastic deformation while the caulking tool is inserted into the insertion groove.

19. The method of claim 17, wherein a thickness between an external circumferential surface of the lock screw and the insertion groove is formed to be smaller than a thickness between an internal circumferential surface of the lock screw and the insertion groove, and
   the caulking tool is gradually inserted into the insertion groove.

20. The method of claim 17, wherein an accommodation portion is formed to be recessed from an internal circumferential surface of the nut coupler, and the upper surface of the lock screw is made to protrude toward the accommodation portion by inserting the caulking tool into the insertion groove adjacent to the accommodation portion.

* * * * *